United States Patent
Lee

(10) Patent No.: US 7,268,830 B2
(45) Date of Patent: Sep. 11, 2007

(54) VIDEO DISPLAY APPLIANCE HAVING FUNCTION OF VARYING SCREEN RATIO AND CONTROL METHOD THEREOF

(75) Inventor: Sang Seok Lee, Gyeongaangbuk-do (KR)

(73) Assignee: LG Electronics Inc., Seoul (KR)

( * ) Notice: Subject to any disclaimer, the term of this patent is extended or adjusted under 35 U.S.C. 154(b) by 458 days.

(21) Appl. No.: 10/892,354

(22) Filed: Jul. 16, 2004

(65) Prior Publication Data

US 2005/0012862 A1    Jan. 20, 2005

(30) Foreign Application Priority Data

Jul. 18, 2003    (KR) ...................... 10-2003-0048990

(51) Int. Cl.
*H04N 5/45*    (2006.01)
*H04N 5/44*    (2006.01)

(52) U.S. Cl. ...................... 348/565; 348/734; 348/588; 348/581

(58) Field of Classification Search ........ 348/565–568, 348/588, 581, 601, 734; 345/660; 715/788, 715/792, 800
See application file for complete search history.

(56) References Cited

U.S. PATENT DOCUMENTS

| 4,249,211 A | * | 2/1981 | Baba et al. ................. 348/565 |
| 5,414,471 A | * | 5/1995 | Saitoh et al. ................. 725/56 |
| 5,822,493 A | * | 10/1998 | Uehara et al. ............... 386/109 |
| 6,081,255 A |   | 6/2000 | Narabu ........................ 345/158 |
| 6,226,040 B1 | * | 5/2001 | Kuo et al. ................... 348/446 |
| 6,317,164 B1 | * | 11/2001 | Hrusecky et al. ........... 348/581 |
| 6,456,276 B1 | * | 9/2002 | Park ........................... 345/158 |
| 6,493,036 B1 | * | 12/2002 | Fernandez ................... 348/561 |
| 6,943,845 B2 | * | 9/2005 | Mizutome et al. .......... 348/555 |
| 2002/0021260 A1 |   | 2/2002 | Meguro ....................... 345/1.3 |
| 2004/0056982 A1 | * | 3/2004 | Allender et al. ............ 348/626 |

FOREIGN PATENT DOCUMENTS

| CN | 1192007 A | 9/1998 |
| CN | 1330490 A | 1/2002 |

OTHER PUBLICATIONS

Chinese Office Action dated Mar. 3, 2006.

* cited by examiner

*Primary Examiner*—Victor R. Kostak
(74) *Attorney, Agent, or Firm*—KED & Associates, LLP

(57) ABSTRACT

Disclosed are a video display appliance having a function of varying a screen ratio of a main picture to a sub-picture depending upon a position of a user when a twin picture function is provided, and a control method thereof. The video display appliance includes a channel selection unit for selecting a channel which transmits data displayed on a main picture region and a sub-picture region, a video processing unit for processing the data transmitted from the channel tuned by the channel selection unit as a signal to be displayed on the main picture region or the sub-picture region, a position detecting unit, disposed at a center of the video display appliance, for detecting a position of a remote controller, a control unit for outputting a control signal to vary the screen ratio of the main picture to the sub-picture in response to position information of the remote controller inputted from the position detecting unit, and a scaler for outputting video signals outputted corresponding to the main picture and the sub-picture from the video processing unit according to the varied screen ratio, in response to the control signal inputted from the control unit.

20 Claims, 5 Drawing Sheets

VIDEO DISPLAY APPLIANCE HAVING FUNCTION OF VARYING SCREEN RATIO AND CONTROL METHOD THEREOF

BACKGROUND OF THE INVENTION

1. Field of the Invention

The present invention relates to a video display appliance, and more particularly, to a video display appliance having a function of varying a screen ratio which can vary a screen ratio of a main picture to a sub-picture depending upon a position of a user when a twin picture function is provided, and a control method thereof.

2. Description of the Related Art

Recently, video display appliances generally employ a twin picture function or a picture-in-picture (PIP) function to simultaneously offer a main picture and a sub-picture on one screen of the video display appliance by receiving different video signals from the exterior.

A related-art apparatus for providing the twin picture function for use in the video display appliance will now be described with reference to the accompanying drawings.

FIG. 1 is a block diagram depicting a related-art apparatus for providing the twin picture function in a video display appliance.

A related-art apparatus for providing the twin picture function includes, as shown in FIG. 1, a channel selection unit 100 for selecting a channel which transmits data for displaying a main picture and a sub-picture, a video processing unit 200 for processing the data tuned by the channel selection unit 100 as a signal to be displayed on a main picture region and a sub-picture region, a control unit 400 for outputting a control signal in response to a demand of a user, a scaler 500 for adjusting a resolution of a video signal processed by the video processing unit 200 according to the control signal of the control-unit 400, and a display unit 600 for displaying the signal outputted from the scaler 500.

The channel selection unit 100 has a first tuner 101 for selecting the channel to display a desired video signal on the main picture region, and a second tuner 102 for selecting the channel to display a desired video signal on the sub-picture region. Further, the video processing unit 200 has a first video processing unit 201 for receiving and processing the video signal of the channel tuned by the first tuner 101, and a second video processing unit 202 for receiving and processing the video signal of the channel tuned by the second tuner 102.

The operation of the related-art apparatus for providing the twin picture function will now be described.

Each data tuned by the first and second tuners 101 and 102 is processed by the first and second video processing units 201 and 202 as the signal capable of being displayed on the display unit 600, and then the signal is transformed by the scaler 500 to confirm to a predetermined resolution, thereby displaying the signal on the display unit 600.

At that time, if the user selects the twin picture function not the PIP function, the main picture and the sub-picture are displayed in the same size.

There is a problem in that since the main picture and the sub-picture are displayed in the same size regardless of the position of the user, the viewing sensitivity of the user deteriorates.

SUMMARY OF THE INVENTION

Accordingly, the present invention is directed to an apparatus for providing a twin picture function that substantially obviates one or more problems due to limitations and disadvantages of the related art.

It is an object of the present invention to provide a video display appliance having a twin picture function that can provide various screen ratios depending upon a position of a viewer when the twin picture function is provided.

Another object of the present invention is to provide a video display appliance having a twin picture function that can manually adjust the screen ratio by a viewer's input, or automatically adjust the screen ratio depending upon a position of the viewer.

A further object of the present invention is to provide a video display appliance having a twin picture function that enables the position of a remote controller to be easily detected.

To achieve these objects and other advantages and in accordance with the purpose of the invention, as embodied and broadly described herein, there is provided a video display appliance having a function of varying a screen ratio of twin pictures when a main picture and a sub-picture are simultaneously displayed, the video display appliance comprising: a channel selection unit for selecting a channel which transmits data displayed on a main picture region and a sub-picture region; a video processing unit for processing the data transmitted from the channel tuned by the channel selection unit as a signal to be displayed on the main picture region or the sub-picture region; a position detecting unit, disposed at a center of the video display appliance, for detecting a position of a remote controller; a control unit for outputting a control signal to vary the screen ratio of the main picture to the sub-picture in response to position information of the remote controller inputted from the position detecting unit; and a scaler for outputting video signals outputted corresponding to the main picture and the sub-picture from the video processing unit according to the varied screen ratio, in response to the control signal inputted from the control unit.

The control unit varies the screen ratio of the main picture to the sub-picture, in response to a desired command signal inputted from the remote controller.

Alternatively, the control unit varies the screen ratio so that a size of one screen, adjacent to the remote controller, between the main picture and the sub-picture is increased more than that of the other screen, in response to the position information of the remote controller inputted from the position detecting unit.

The main picture is displayed at a left of a display unit of the video display appliance, and the sub-picture is displayed at a right of the display unit of the video display appliance.

The position information of the remote controller comprises an angle of the remote controller deviated leftwardly or rightwardly from a center of the display unit. A size of the main picture is increased in proportion to the angle of the remote controller deviated leftwardly from the center of the display unit, and a size of the sub-picture is increased in proportion to the angle of the remote controller deviated rightwardly from the center of the display unit.

According to another aspect of the present invention, there is provided a method of controlling a video display appliance having a function of varying a screen ratio of twin pictures when a main picture and a sub-picture are simultaneously displayed, the method comprising the steps of: a) inputting a signal of selecting a twin picture mode by a viewer; b) detecting a position of a remote controller of the video display appliance in response to the signal of selecting the twin picture mode; c) varying the displayed screen ratio of the main picture to the sub-picture in response to position information of the detected remote controller; and d) displaying the main picture and the sub-picture according to the varied screen ratio.

It is preferable that the step c comprises the steps of: increasing a size of the main picture based on the position information of the detected remote controller if the remote controller positions at a left; decreasing the size of the main picture if the remote controller positions at a right; and maintaining the screen ratio of the main picture to the sub-picture in a ratio of 1:1 if the remote controller positions at a center.

According to still another aspect of the present invention, there is provided a method of controlling a video display appliance having a function of varying a screen ratio of twin pictures when a main picture and a sub-picture are simultaneously displayed, the method comprising the steps of: a) inputting a signal of selecting a twin picture mode by a viewer; b) varying the screen ratio of the main picture to the sub-picture in response to a desired command signal inputted by the remote controller; and c) displaying the main picture and the sub-picture according to the varied screen ratio.

According to still another aspect of the present invention, there is provided a method of controlling a video display appliance having a function of varying a screen ratio of twin pictures when a main picture and a sub-picture are simultaneously displayed, the method comprising the steps of: a) inputting a signal of selecting a twin picture mode by a viewer; b) determining whether a function of automatically adjusting the screen ratio is selected, in response to the signal of selecting the twin picture mode; c) detecting a position of a remote controller of the video display appliance, if the function of automatically adjusting the screen ratio is selected; d) varying the displayed screen ratio of the main picture to the sub-picture in response to position information of the detected remote controller; and e) displaying the main picture and the sub-picture according to the varied screen ratio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, an example of which is illustrated in the accompanying drawings.

Figure 3:
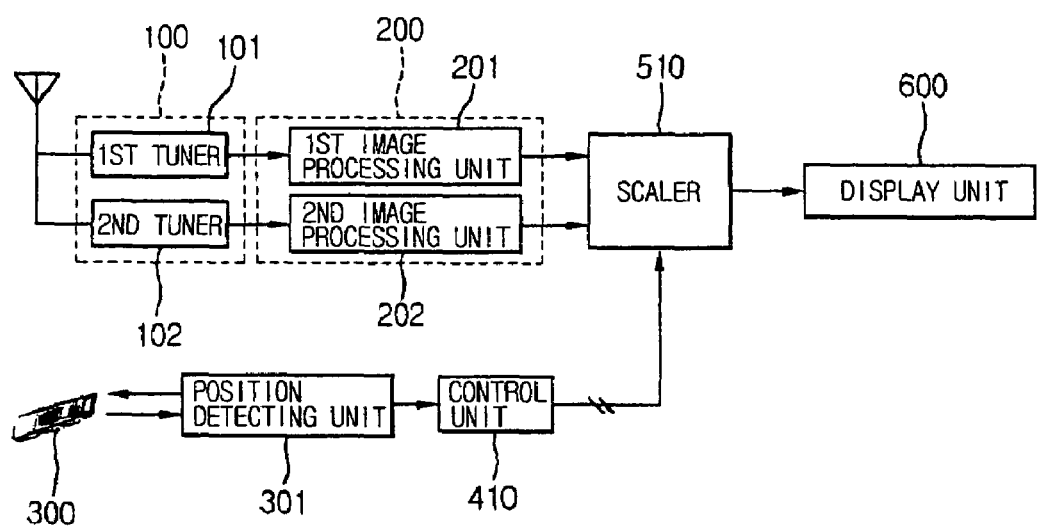
FIG. 3 is a block diagram depicting an apparatus for providing a twin picture function in a video display appliance according to a preferred embodiment of the present invention.
Figure 4:
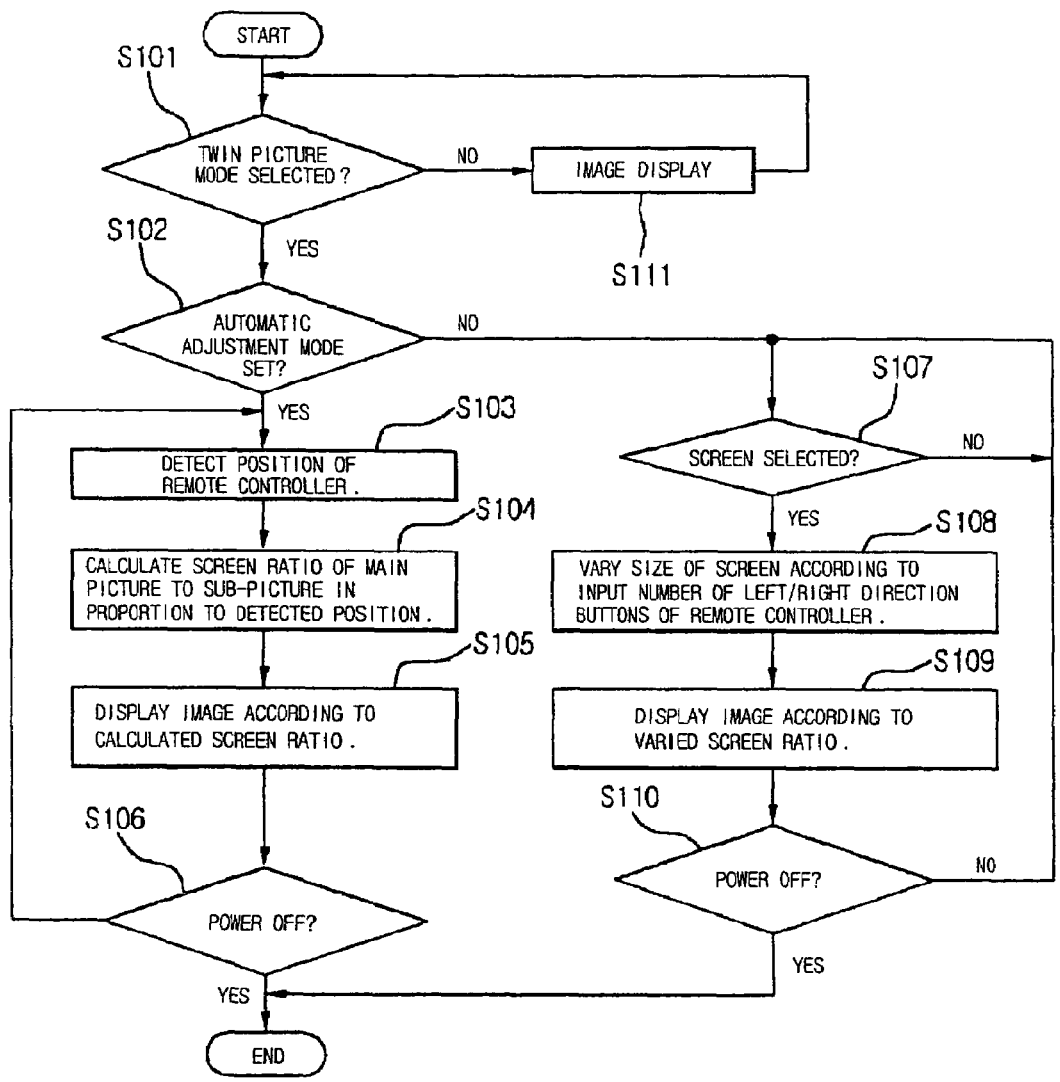
FIG. 4 is a flowchart illustrating a method of controlling a function of varying a screen ratio in a video display appliance according to a preferred embodiment of the present invention.
Figure 5A:
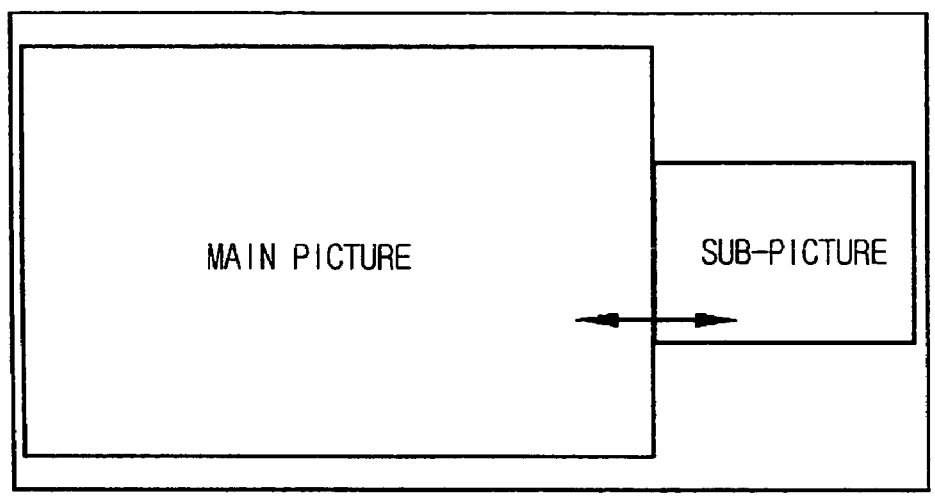
FIGS. 5 and 6 are views illustrating one example of a screen configuration of a video display appliance according to the present invention.
Figure 5B:
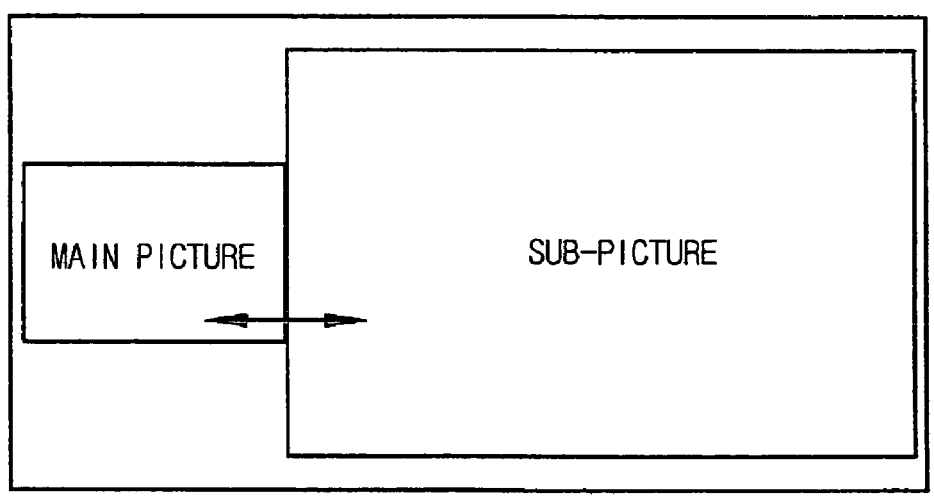
Figure 6:
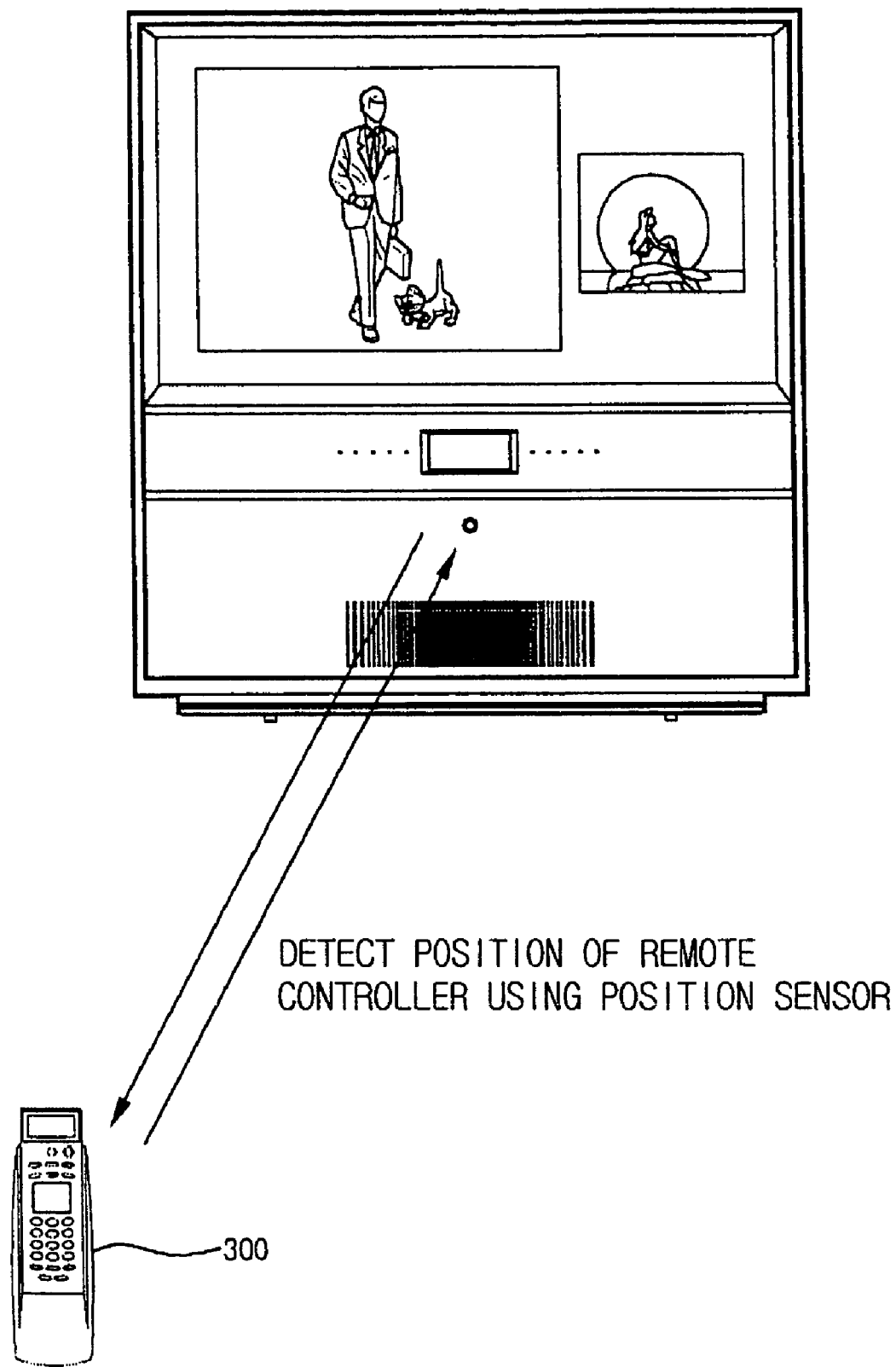

FIG. 3 is a block diagram depicting an apparatus for providing a twin picture function in a video display appliance according to a preferred embodiment of the present invention, FIG. 4 is a flowchart illustrating a method of controlling a function of varying a screen ratio in a video display appliance according to a preferred embodiment of the present invention, and FIGS. 5 and 6 are views illustrating one example of a screen configuration of a video display appliance according to the present invention.

Figure 1:
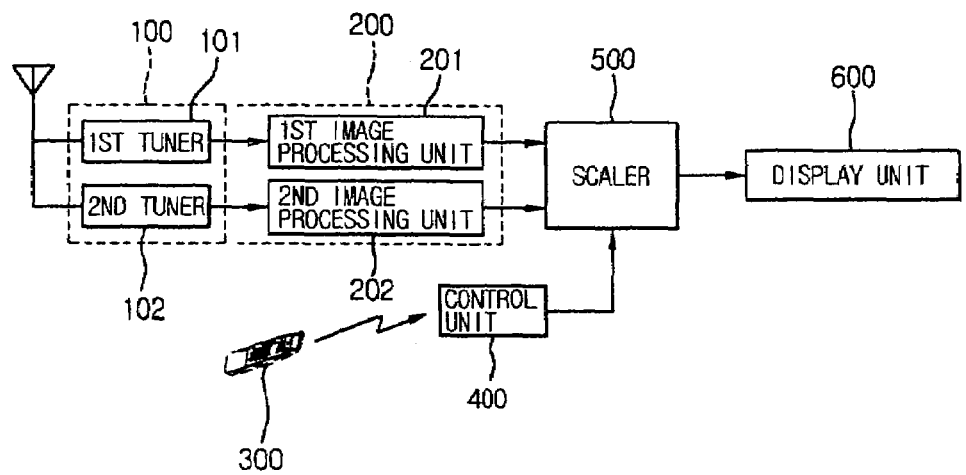
FIG. 1 is a block diagram depicting a related-art apparatus for providing a twin picture function in a video display appliance.
Figure 2:
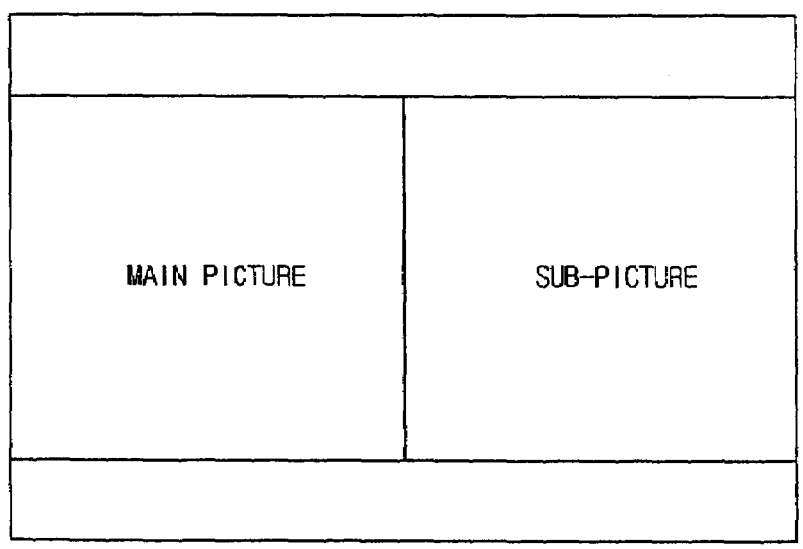
FIG. 2 is a view illustrating one example of a screen configuration of a related-art video display appliance.

In the below description, the same elements as those of the related-art video display appliance shown in FIG. 1 are denoted by the same reference characters.

The video display appliance having a function of varying a screen ratio according to one preferred embodiment of the present invention includes, as shown in FIG. 3, a channel selection unit 100 for selecting a channel which transmits data for displaying a main picture and a sub-picture, a video processing unit 200 for processing the data tuned by the channel selection unit 100 as signals to be displayed on a main picture region and a sub-picture region, a position detecting unit 301 for detecting a position of a remote controller 300, a control unit 410 for outputting a control signal to vary the screen ratio of the main/sub-pictures of a video signal outputted from the video processing unit 200 according to the detected result of the position detecting unit 301 when a viewer selects a twin picture function, a scaler 510 for processing the video signal outputted from the video processing unit 200 according to the control signal of the control unit 410 to output the video signal as a given screen ratio, and a display unit 600 for displaying the main/sub-pictures adjusted by the scaler 510.

The channel selection unit 100 has a first tuner 101 for selecting the channel to display a desired video signal on the main picture region, and a second tuner -102 for selecting the channel to display a desired video signal on the sub-picture region.

The video processing unit 200 has a first video processing unit 201 for processing the video signal of the channel tuned by the first tuner 101 to display the video signal, and a second video processing unit 202 for processing the video signal of the channel tuned by the second tuner 102 to display the video signal.

The operation of the video display appliance having the function of varying the screen ratio according to the preferred embodiment of the present invention will now be described.

First, in the case where the viewer desires the screen ratio of the main/sub-pictures to be automatically varied when selecting a twin picture mode, the viewer sets an automatic adjustment mode for automatically adjusting the screen ratio of the main/sub-pictures on a menu.

Specifically, in the case where the viewer selects the twin picture with the automatic adjustment mode previously selected, the position of the remote controller 300 is detected by the position detecting unit 301. The position detecting unit 301 determines the position of the remote controller 300 as the position of the viewer, so that it varies the screen ratio to enlarge one screen adjacent to the viewer and to relatively reduce the other screen.

A control method of the video display appliance having the function of adjusting the screen ratio according to the present invention will now be described with reference to FIG. 4.

First, it is determined whether the viewer selects the twin picture mode (step S101).

In step S101, if the viewer selects the twin picture mode, it is determined whether the automatic adjustment mode for automatically adjusting the screen ratio of the main/sub-pictures is previously set (step S102).

In step S102, if the automatic adjustment mode is previously set by the viewer, the position of the remote controller is detected by the position detecting unit (step S103).

The screen ratio of the main picture to the sub-picture is calculated depending upon the detected position of the remote controller (step S104).

The main/sub-pictures varied according to the calculated screen ratio are displayed on the display unit (steps S105 and S106).

If the viewer inputs a power-off command, the process is completed, but otherwise the process returns to the step S103 (step S107).

In step S102, if the automatic adjustment mode is not previously set by the viewer, the twin picture mode is recognized as a manual adjustment mode, and it is determined whether the viewer selects the screen to be adjusted (step S107).

In step S107, if the viewer selects the screen to be adjusted, the screen ratio is adjusted on the interested screen according to key signals inputted by left/right direction keys of the remote controller to realize the main/sub-pictures (steps S108 and S109).

The viewer inputs the power-off command to complete the process (steps S110).

According to the present invention, the video display appliance having the function of varying the screen ratio and the method of controlling the function can vary the screen ratio of the main/sub-pictures depending upon the position of the remote controller. The viewer can vary the screen ratio of the main/sub-pictures by directly inputting signals from the direction keys of the remote controller.

As shown in FIG. 5a, in the case that the viewer is positioned to the left side of the screen, if the viewer inputs the right direction key of the remote controller to increase the size of the main picture displayed on the left screen by using the remote controller, the size of the main picture is increased according to the number of keys inputted by the viewer.

On the contrary, in the case that the viewer is positioned to the right side of the screen, if the viewer inputs the right direction key of the remote controller to increase the size of the sub-picture displayed on the right screen by using the remote controller, the size of the sub-picture is increased according to the number of keys inputted by the viewer.

Further, in the case that the automatic adjustment mode is set, as shown in FIG. 6, the position of the remote controller is detected, regardless of the input of the viewer. If the remote controller is positioned to the left of the screen, the size of the screen displayed on the left screen, when viewing at the position of the viewer, in the main/sub-pictures displayed on the display unit is increased in proportion to the angle of the remote controller to the screen.

Meanwhile, if the remote controller is positioned to the right of the screen, the size of the screen displayed on the right screen, when viewing at the position of the viewer, in the main/sub-pictures displayed on the display unit is increased in proportion to the angle of the remote controller to the screen.

Finally, if the remote controller is positioned to the center of the screen, the screen ratio of the main/sub-pictures is maintained in a ratio of 1:1.

With the above description, according to the present invention, the video display appliance having the function of varying the screen ratio and the control method thereof have the following effects:

First, when the viewer selects the twin picture function, a ratio of left/right screens can be varied depending upon the position of the viewer, thereby providing the viewer with various screen ratios.

Second, the screen ratio is manually adjusted by the viewer or is automatically adjusted depending upon the position of the viewer, thereby improving the view sensitivity of the viewer.

Finally, in the case of automatically varying the screen ratio, the position of the viewer is detected through the position of the remote controller, thereby shortening the time required for determining the position of the remote controller.

The foregoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video display appliance having a function of varying a screen ratio of twin pictures when a main picture and a sub-picture are simultaneously displayed, the video display appliance comprising:
    a channel selection circuit for selecting a channel which transmits data displayed on a main picture region and a sub-picture region;
    a video processing circuit for processing the data transmitted from the channel tuned by the channel selection circuit as a signal to be displayed on the main picture region or the sub-picture region;
    a position detecting circuit, disposed at a center of the video display appliance, for detecting a position of a remote controller;
    a control circuit for outputting a control signal to vary the screen ratio of the main picture to the sub-picture in response to position information of the remote controller inputted from the position detecting circuit; and
    a scaler for outputting video signals outputted corresponding to the main picture and the sub-picture from the video processing circuit according to the varied screen ratio, in response to the control signal inputted from the control circuit.

2. The video display appliance as claimed in claim 1, wherein the control circuit varies the screen ratio of the main picture to the sub-picture, in response to a desired command signal inputted from the remote controller.

3. The video display appliance as claimed in claim 1, wherein the control circuit varies the screen ratio so that a size of one screen, adjacent to the remote controller, between the main picture and the sub-picture is increased more than that of the other screen, in response to the position information of the remote controller inputted from the position detecting circuit.

4. The video display appliance as claimed in claim 1, wherein the main picture is displayed at a left of a display unit of the video display appliance, and the sub-picture is displayed at a right of the display unit of the video display appliance.

5. The video display appliance as claimed in claim 4, wherein the position information of the remote controller comprises an angle of the remote controller deviated leftwardly or rightwardly from a center of the display unit.

6. The video display appliance as claimed in claim 5, wherein a size of the main picture is increased in proportion to the angle of the remote controller deviated leftwardly from the center of the display unit, and a size of the sub-picture is increased in proportion to the angle of the remote controller deviated rightwardly from the center of the display unit.

7. A method of controlling a video display appliance having a function of varying a screen ratio of twin pictures when a main picture and a sub-picture are simultaneously displayed, the method comprising:
   a) receiving a signal of selecting a twin picture mode,
   b) detecting a position of a remote controller of the video display appliance in response to the signal of selecting the twin picture mode;
   c) varying the displayed screen ratio of the main picture to the sub-picture in response to position information of the detected remote controller; and
   d) displaying the main picture and the sub-picture according to the varied screen ratio.

8. The method as claimed in claim 7, wherein the main picture is displayed at a left of a display unit of the video display appliance, and the sub-picture is displayed at a right of the display unit of the video display appliance.

9. The method as claimed in claim 8, wherein c) comprises the following based on the position information of the detected remote controller:
   increasing a size of the main picture, if the remote controller positions at a left;
   decreasing the size of the main picture, if the remote controller positions at a right; and
   maintaining the screen ratio of the main picture to the sub-picture in a ratio of 1:1, if the remote controller positions at a center.

10. The method as claimed in claim 7, wherein a size of the main picture is increased in proportion to the angle of the remote controller deviated leftwardly from the center of a display unit, and a size of the sub-picture is increased in proportion to the angle of the remote controller deviated rightwardly from the center of the display unit.

11. A method of controlling a video display appliance having a function of varying a screen ratio of twin pictures when a main picture and a sub-picture are simultaneously displayed, the method comprising:
   a) receiving a signal of selecting a twin picture mode;
   b) determining whether an automatic mode has been set for adjusting the screen ratio of the main and sub-pictures based on position of a remote controller;
   c) if said automatic mode has not been set, varying the screen ratio of the main picture to the sub-picture in response to a desired command signal inputted by the remote controller; and d) displaying the main picture and the sub-picture according to the varied screen ratio.

12. The method as claimed in claim 11, wherein the main picture is displayed at a left of a display unit of the video display appliance, and the sub-picture is displayed at a right of the display unit of the video display appliance.

13. A method of controlling a video display appliance having a function of varying a screen ratio of twin pictures when a main picture and a sub-picture are simultaneously displayed, the method comprising:
   a) inputting a signal of selecting a twin picture mode;
   b) determining whether a function of automatically adjusting the screen ratio is selected, in response to the signal of selecting the twin picture mode;
   c) detecting a position of a remote controller of the video display appliance, if the function of automatically adjusting the screen ratio is selected;
   d) varying the displayed screen ratio of the main picture to the sub-picture in response to position information of the detected remote controller; and
   e) displaying the main picture and the sub-picture according to the varied screen ratio.

14. The method as claimed in claim 13, wherein the position information of the remote controller comprises an angle of the remote controller deviated leftwardly or rightwardly from a center of a display unit.

15. The method as claimed in claim 14, wherein a size of the main picture is increased in proportion to the angle of the remote controller deviated leftwardly from the center of the display unit, and a size of the sub-picture is increased in proportion to the angle of the remote controller deviated rightwardly from the center of the display unit.

16. A video processing system, comprising:
   a detector to detect a position of a remote controller;
   a circuit to generate a control signal based on said position, said control signal for varying a screen ratio of a first picture and a second picture to be simultaneously displayed on a display unit in twin-picture mode; and
   a scalar to output video signals corresponding to the first and second pictures to the display unit based on said control signal.

17. The system of claim 16, wherein the first and second pictures are derived from different television channels.

18. The system of claim 17, wherein the first picture is received from a first tuner and the second picture is received from a second tuner.

19. The system of claim 16, wherein the scalar increases the size of the first picture relative to the second picture when position information from the detector indicates that the remote controller is closer to the first picture, said control signal generated based on said position information.

20. The system of claim 19, wherein said position information provides an indication of whether the remote controller is located left or right of a center of the display unit.

* * * * *